United States Patent
Lee et al.

(10) Patent No.: US 9,232,541 B2
(45) Date of Patent: Jan. 5, 2016

(54) METHOD OF TRANSMITTING RANDOM ACCESS RESPONSE SIGNAL IN WIRELESS COMMUNICATION SYSTEM AND APPARATUS THEREOF

(75) Inventors: Daewon Lee, Anyang-si (KR);
Youngdae Lee, Anyang-si (KR);
Joonkui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 14/000,817

(22) PCT Filed: Aug. 10, 2011

(86) PCT No.: PCT/KR2011/005827
§ 371 (c)(1),
(2), (4) Date: Aug. 21, 2013

(87) PCT Pub. No.: WO2012/144697
PCT Pub. Date: Oct. 26, 2012

(65) Prior Publication Data
US 2013/0329625 A1  Dec. 12, 2013

Related U.S. Application Data

(60) Provisional application No. 61/477,619, filed on Apr. 21, 2011.

(30) Foreign Application Priority Data

Jul. 21, 2011 (KR) .......................... 10-2011-0072510

(51) Int. Cl.
*H04W 74/08* (2009.01)
*H04W 72/04* (2009.01)

(52) U.S. Cl.
CPC .......... *H04W 74/0833* (2013.01); *H04W 74/08* (2013.01); *H04W 72/0413* (2013.01)

(58) Field of Classification Search
CPC ............ H04W 74/08; H04W 74/0833; H04W 72/0413
See application file for complete search history.

(56) References Cited

U.S. PATENT DOCUMENTS 8,331,326 B2 * 12/2012 Wang ................... H04J 11/0069
370/252
8,837,352 B2 * 9/2014 Cho et al. ...................... 370/322

(Continued)

FOREIGN PATENT DOCUMENTS

| EP | 2141852 A1 | 1/2010 |
|----|-----------|--------|
| KR | 1020080097920 A | 11/2008 |
| KR | 101015692 B1 | 2/2011 |

*Primary Examiner* — Parth Patel
*Assistant Examiner* — Kai Chang
(74) *Attorney, Agent, or Firm* — Dentons US LLP

(57) ABSTRACT

A method of transmitting a random access response signal in a wireless communication system is disclosed. The method includes transmitting a random access preamble to a base station, receiving a random access response included in a data region of a specific subframe from the base station, and transmitting an uplink message to the base station based on uplink grant included in the random access response. If the data region is set to be transmitted through multiple layers based on a UE-specific reference signal and the specific subframe is a Multicast Broadcast Single Frequency Network (MBSFN) subframe, the data region is demodulated based on the UE-specific reference signal on the assumption that the data region is transmitted via a predetermined antenna port using a single-antenna transmission scheme.

6 Claims, 11 Drawing Sheets

(56) References Cited

U.S. PATENT DOCUMENTS

| | | | |
|---|---|---|---|
| 8,942,081 B2* | 1/2015 | Kang | H04W 72/042 370/208 |
| 2009/0197589 A1* | 8/2009 | Kitazoe | 455/422.1 |
| 2010/0275083 A1 | 10/2010 | Nam et al. | |
| 2011/0014922 A1* | 1/2011 | Jen | 455/450 |
| 2011/0243056 A1* | 10/2011 | Jen | H04L 5/0007 370/312 |
| 2011/0263286 A1* | 10/2011 | Damnjanovic et al. | 455/513 |
| 2012/0039295 A1* | 2/2012 | Quan et al. | 370/329 |
| 2012/0093101 A1* | 4/2012 | Dai | H04L 5/0048 370/329 |
| 2012/0231809 A1* | 9/2012 | Siomina et al. | 455/456.1 |
| 2012/0243496 A1* | 9/2012 | Zhu et al. | 370/329 |
| 2012/0263095 A1* | 10/2012 | Quan et al. | 370/312 |
| 2012/0307716 A1* | 12/2012 | Zhao et al. | 370/315 |
| 2012/0307811 A1* | 12/2012 | Kwon et al. | 370/336 |
| 2013/0039284 A1* | 2/2013 | Marinier | H04L 5/001 370/329 |
| 2013/0083719 A1* | 4/2013 | Seo | H04L 5/0057 370/312 |
| 2013/0148536 A1* | 6/2013 | Frenger et al. | 370/252 |
| 2013/0170385 A1* | 7/2013 | Frenger et al. | 370/252 |
| 2013/0195079 A1* | 8/2013 | Xu et al. | 370/335 |
| 2014/0044070 A1* | 2/2014 | Chen | H04B 7/0486 370/329 |

* cited by examiner (a) CONTROL-PLANE PROTOCOL STACK (b) USER-PLANE PROTOCOL STACK (a)

(b)

METHOD OF TRANSMITTING RANDOM ACCESS RESPONSE SIGNAL IN WIRELESS COMMUNICATION SYSTEM AND APPARATUS THEREOF

This application is a 35 USC §371 National Stage entry of International Application No. PCT/KR2011/005827 filed on Aug. 10, 2011, and claims priority to U.S. Provisional Application No. 61/477,619 filed on Apr. 21, 2011, and Korean Application No. KR 10-2011-0072510, filed Jul. 21, 2011, all of which are incorporated by reference in their entirety therein.

TECHNICAL FIELD

The present invention relates to a wireless communication system, and more particularly, to a method of transmitting a random access response signal in a wireless communication system and an apparatus thereof.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network architecture of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10 or 20 MHz to provide a downlink or uplink transmission service to several UEs. Different cells may be set to provide different bandwidths. The eNB controls data transmission or reception of a plurality of UEs. The eNB transmits downlink (DL) scheduling information with respect to DL data so as to inform a corresponding UE of time/frequency domain, coding, data size, and Hybrid Automatic Repeat and reQest (HARQ)-related information. In addition, the eNB transmits uplink (UL) scheduling information with respect to UL data to a corresponding UE so as to inform the UE of an available time/frequency domain, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF INVENTION

Technical Problem

An object of the present invention devised to solve the problem lies on a method of transmitting a random access response signal in a wireless communication system and an apparatus thereof.

Solution to Problem

The object of the present invention can be achieved by providing a method of performing a random access procedure at a user equipment (UE) in a wireless communication system including transmitting a random access preamble to a base station, receiving a random access response included in a data region of a specific subframe from the base station, and transmitting an uplink message to the base station based on uplink grant included in the random access response, wherein, if the data region is set to be transmitted through multiple layers based on a UE-specific reference signal and the specific subframe is a Multicast Broadcast Single Frequency Network (MBSFN) subframe, the data region is demodulated based on the UE-specific reference signal on the assumption that the data region is transmitted via a predetermined antenna port using a single-antenna transmission scheme.

The receiving the random access response may include detecting downlink grant masked with a Random Access (RA)-Radio Network Temporary Identity (RNTI) in the control region of the MBSFN subframe, and acquiring the random access response from the data region of the MBSFN subframe based on the downlink grant.

In another aspect of the present invention, provided herein is a user equipment (UE) in a wireless communication system including a wireless communication module configured to transmit and receive a signal to and from a base station, and a processor configured to control the wireless communication module and process the signal, wherein the processor controls transmission of a random access preamble to the base station, reception of a random access response included in a data region of a specific subframe from the base station and transmission of an uplink message to the base station based on the uplink grant included in the random access response, and, if the data region is set to be transmitted through multiple layers based on a UE-specific reference signal and the specific subframe is a Multicast Broadcast Single Frequency Network (MBSFN) subframe, the data region is demodulated based on the UE-specific reference signal on the assumption that the data region is transmitted via a predetermined antenna port using a single-antenna transmission scheme.

The processor may detect downlink grant masked with a Random Access (RA)-Radio Network Temporary Identity (RNTI) in the control region of the MBSFN subframe, and acquire the random access response from the data region of the MBSFN subframe based on the downlink grant.

A cell-specific reference signal may not be present in the data region of the MBSFN subframe. The UE-specific reference signal may be defined by the predetermined antenna port. The predetermined antenna port is a logical antenna port 7.

Advantageous Effects of Invention

According to the embodiments of the present invention, a base station can efficiently transmit a random access response signal to a UE even in an MBSFN subframe in a wireless communication system.

Effects of the present invention are not limited to the above-described effects and the other effects become apparent to those skilled in the art by means of the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
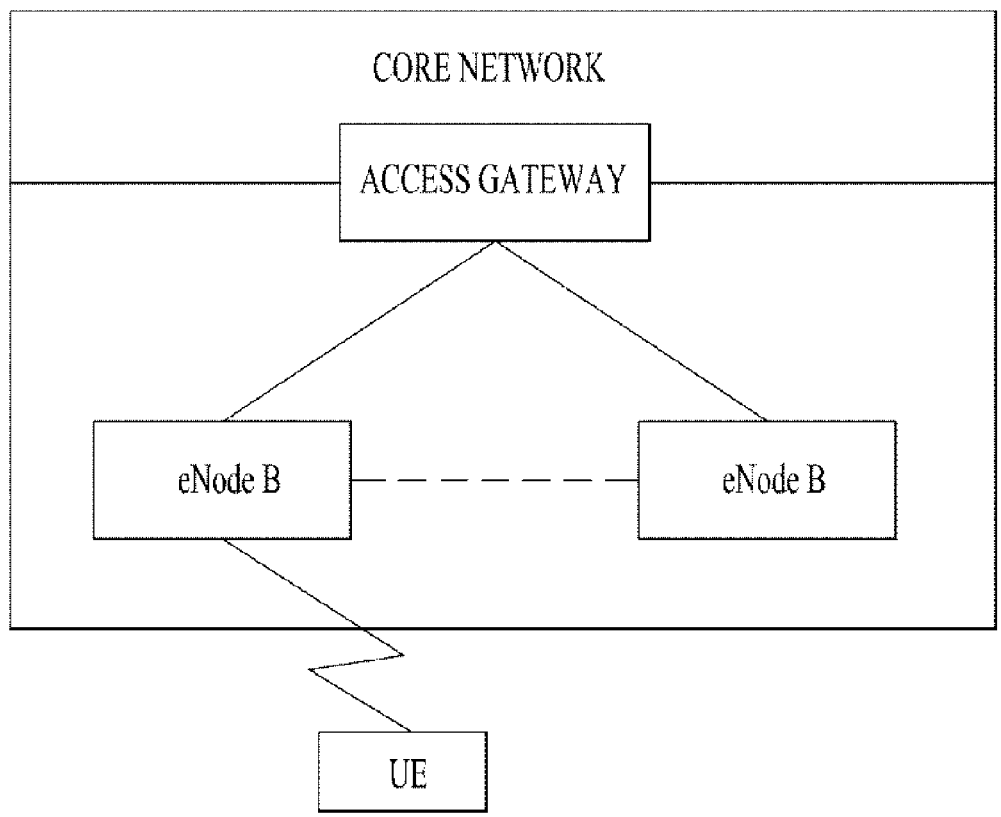
FIG. 1 is a diagram showing a network architecture of an Evolved Universal Mobile Telecommunications System (E-UMTS) as an example of a wireless communication system.
Figure 2:
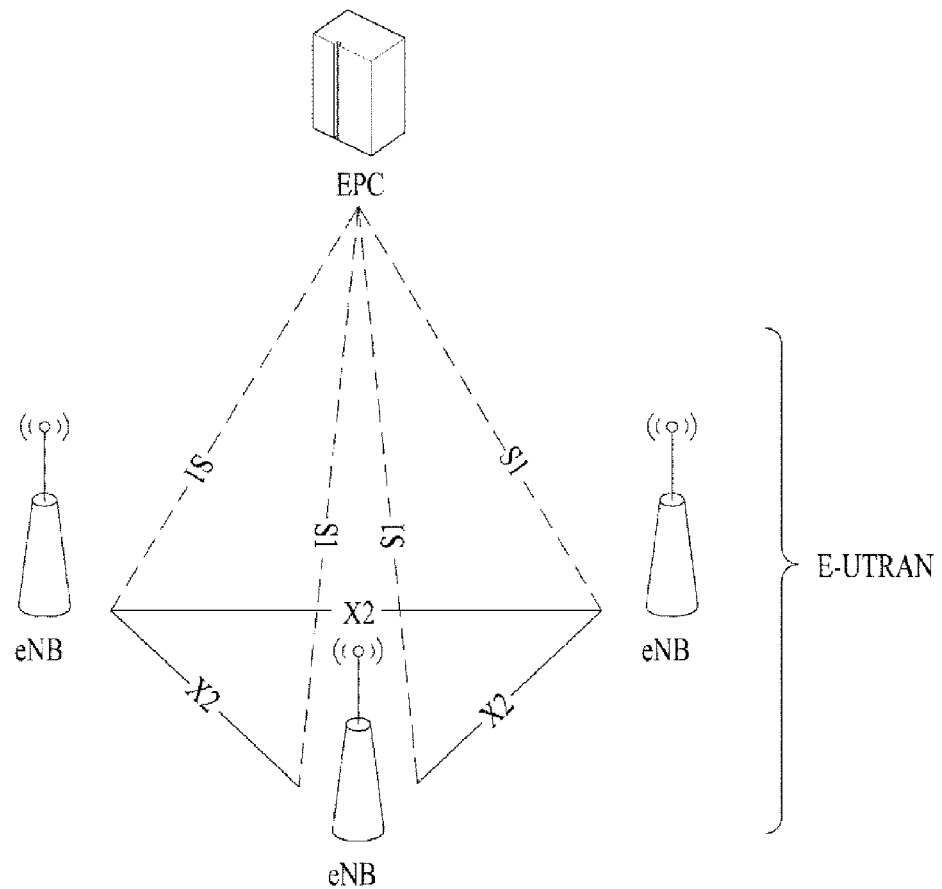
FIG. 2 is a conceptual diagram showing a network architecture of an Evolved Universal Terrestrial Radio Access Network (E-UTRAN)

FIG. 2 is a conceptual diagram showing a network architecture of an Evolved

Universal Terrestrial Radio Access Network (E-UTRAN). In particular, an E-UTRAN system is an evolved form from the UTRAN system. The E-UTRAN includes cells (eNBs) which are connected through X2 interfaces. The cell is connected to a UE through an S1 interface and is connected to an Evolved Packet Core (EPC) through an S1 interface.

The EPC includes a Mobility Management Entity (MME), a Serving-Gateway (S-GW) and a Packet Data Network-Gateway (PDN-GW). The MME has UE access information or information about UE capability, which is mainly used to manage UE mobility. The S-GW is a gateway having an E-UTRAN as an end point and the PDN-GW is a gateway having a Packet Data Network (PDN) as an end point.

Figure 3:
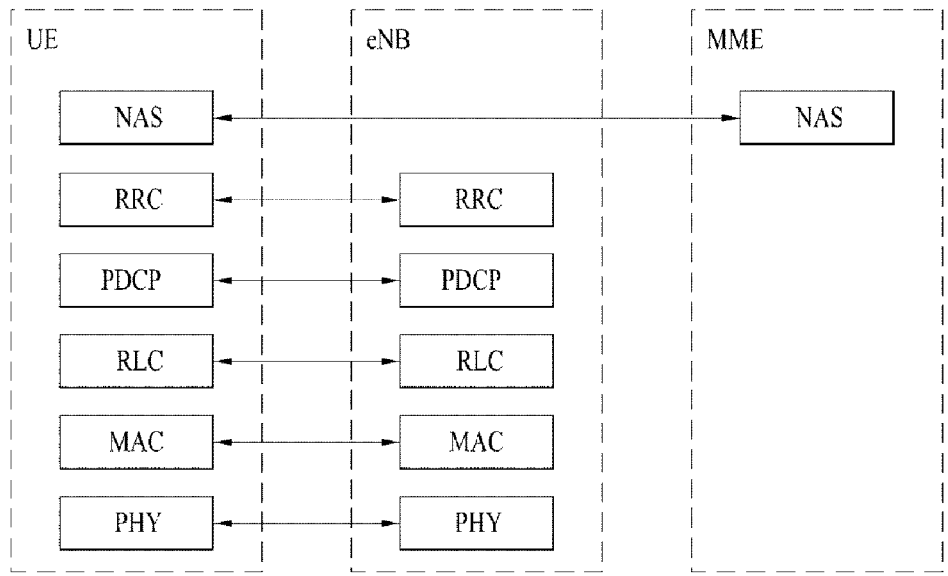
FIG. 3 is a diagram showing a control-plane and user-plane structure of a radio interface protocol between a User Equipment (UE) and an E-UTRAN based on a 3rd Generation Partnership Project (3GPP) radio access network standard.
Figure 3:
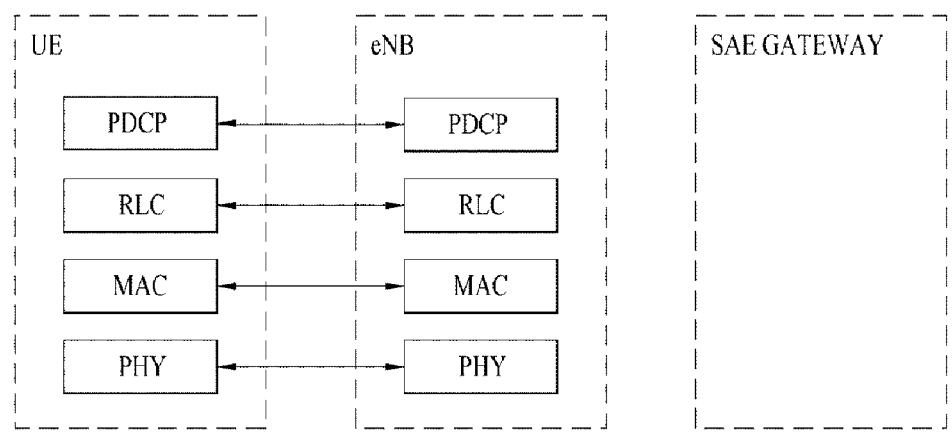

FIG. 3 shows a control plane and user plane structure of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to an upper layer using a physical channel. The PHY layer is connected to a Medium Access Control (MAC) layer on an upper layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH)

for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
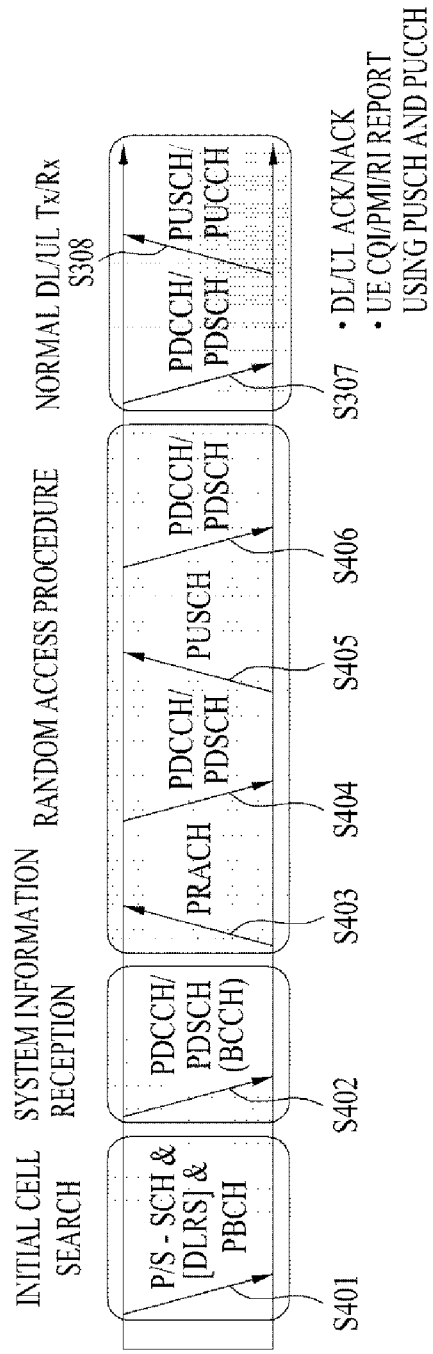
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). For the initial cell search operation, the UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message of the preamble through the PDCCH and the PDSCH corresponding thereto (S404). In the case of contention-based RACH, a contention resolution procedure may be further performed.

The UE which performs the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives Downlink Control Information (DCI) through a PDCCH. The DCI includes control information such as resource allocation information of the UE and the format thereof is changed according to its use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 5:
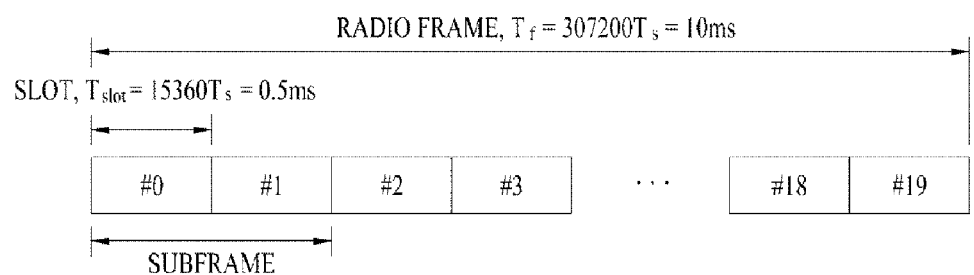
FIG. 5 is a diagram showing the architecture of a radio frame used in Long Term Evolution (LTE)

FIG. 5 is a diagram showing the architecture of a radio frame used in Long Term Evolution (LTE).

Referring to FIG. 5, the radio frame has a length of 10 ms ($327200*T_s$) and includes 10 subframes with the same size. Each of the subframes has a length of 1 ms and includes two slots. Each of the slots has a length of 0.5 ms ($15360*T_s$). Ts denotes a sampling time, and is represented by $T_s=1/(15 kHz*2048)=3.2552*10^{-8}$ (about 33 ns). Each slot includes a plurality of OFDM symbols of SC-FDMA in a time domain, and includes a plurality of resource blocks (RBs) in a frequency domain. In the LTE system, one RB includes 12 subcarriers*7(6) OFDM symbols. A Transmission Time Interval (TTI) which is a unit time for transmission of data may be determined in units of one or more subframes. The architecture of the radio frame is only exemplary and the number of subframes included in the radio frame, the number of slots included in the subframe, or the number of OFDM symbols included in the slot may be variously changed.

Figure 6:
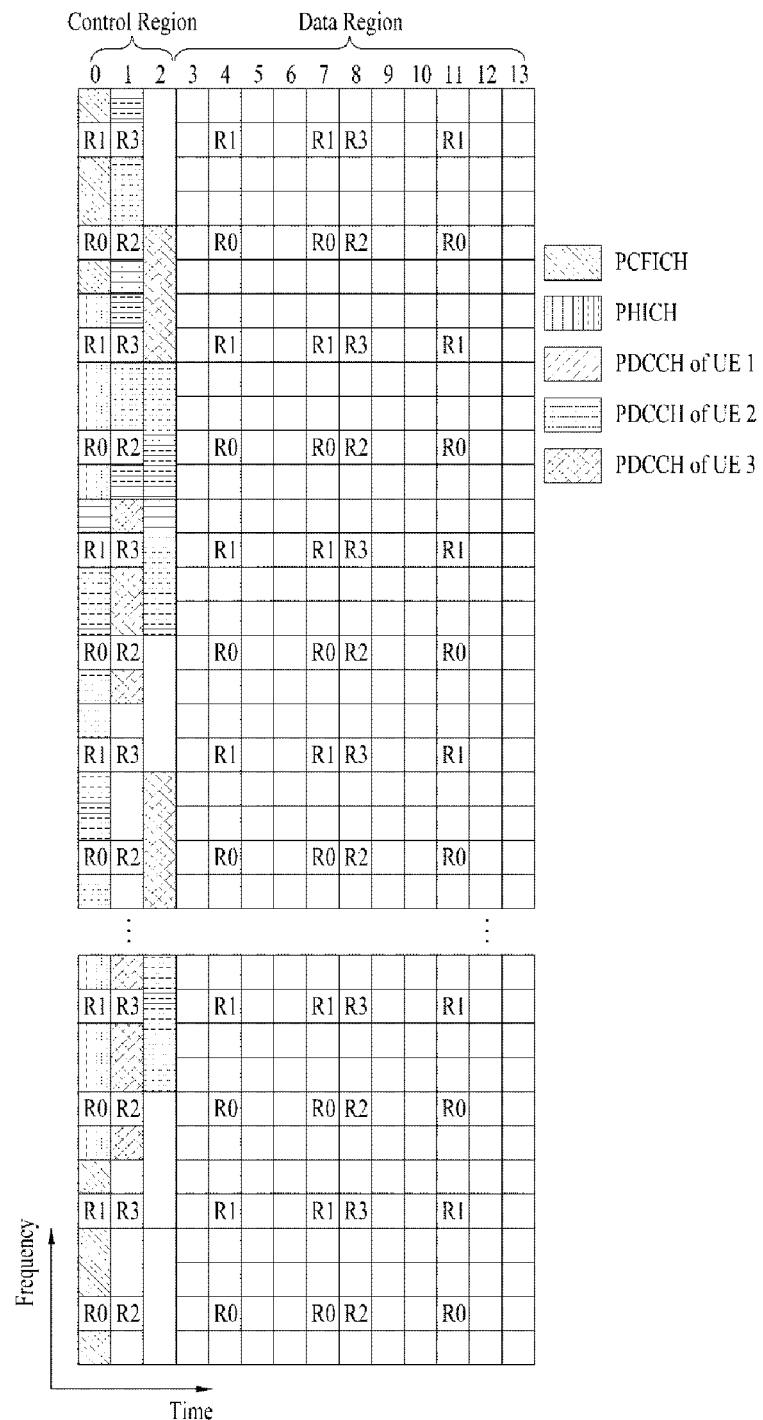
FIG. 6 is a diagram showing a resource grid for an uplink slot.

FIG. 6 is a diagram showing a control channel included in a control region of one subframe in a downlink radio frame.

Referring to FIG. 6, a subframe includes 14 OFDM symbols. The first to third OFDM symbols are used as a control region and the remaining 13 to 11 OFDM symbols are used as a data region, according to subframe settings. In FIG. 6, R1 to R4 denote reference signals (RS) or pilot signals of antennas 0 to 3. The RS is fixed to a constant pattern within the subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The PCFICH informs the UE of the number of OFDM symbols used for the PDCCH for every subframe. The PCFICH is located at a first OFDM symbol and is set prior to the PHICH and the PDCCH. The PCFICH includes four Resource Element Groups (REGs) and each REG is distributed in the control region based on a cell identity (ID). One REG includes four resource elements (REs). The RE denotes minimum physical resources defined as one subcarrier?one OFDM symbol. The PCFICH value indicates a value of 1 to 3 or 2 to 4 according to bandwidth and is modulated using a Quadrature Phase Shift Keying (QPSK) scheme.

The PHICH is used to carry HARQ ACK/NACK for uplink transmission. That is, the PHICH denotes a channel through which DL ACK/NACK information for UL HARQ is transmitted. The PHICH includes one REG and is scrambled on a cell-specific basis. ACK/NACK is indicated by one bit and is modulated using a Binary Phase Shift Keying (BPSK) scheme. The modulated ACK/NACK is spread with a spreading factor (SF) of 2 or 4. A plurality of PHICHs mapped to the same resources configures a PHICH group. The number of PHICHs multiplexed in the PHICH group is determined according to the number of SFs. The PHICH (group) is repeated three times in order to obtain diversity gain in the frequency domain and/or the time domain.

The PDCCH is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging CHannel (PCH) and a Downlink-Shared Channel (DL-SCH), both of which are transport channels, uplink scheduling grant, HARQ information, etc. The PCH and the DL-SCH are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, a UE located within a cell monitors a PDCCH using its own RNTI information, and if one or more UEs having "A" RNTI are present, the UEs receive the PDCCH and receive the PDSCH indicated by "B" and "C" through the information about the received PDCCH.

Figure 7:
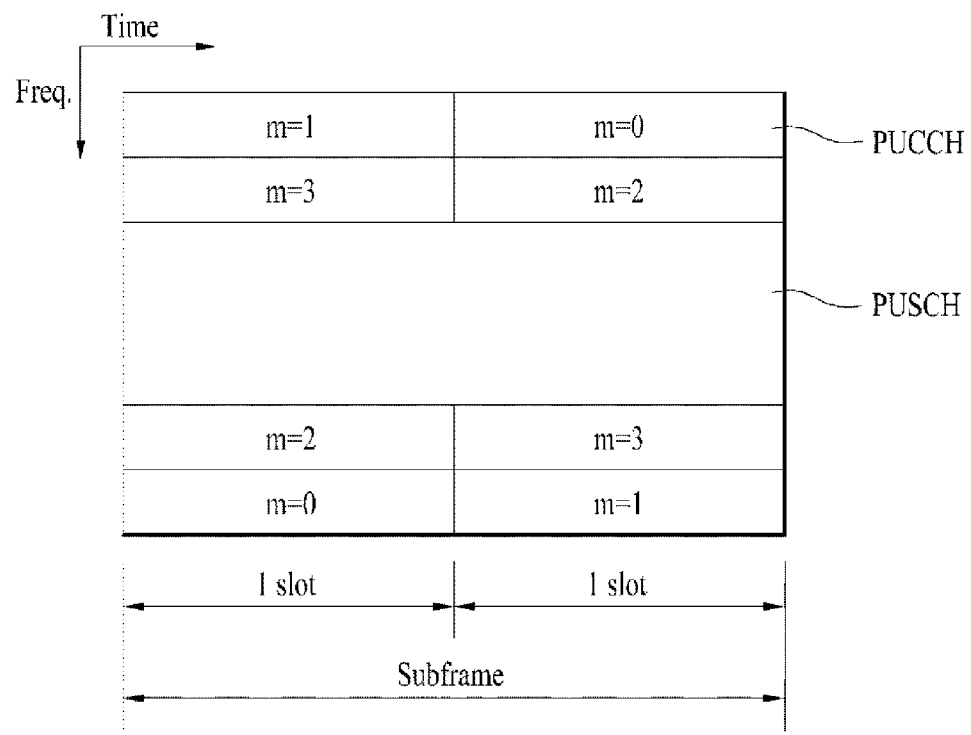
FIG. 7 is a diagram showing the structure of an uplink subframe to which SC-FDMA is applied.

FIG. 7 is a diagram showing the structure of an uplink subframe to which SC-FDMA is applied.

Referring to FIG. 7, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. The UE does not simultaneously transmit the PUCCH and the PUSCH.

Uplink control information transmitted on the PUCCH includes an ACK/NACK signal used for HARQ, a Channel Quality Indicator (CQI) indicating a downlink channel state, a scheduling request signal which is an uplink radio resource allocation request, etc. If the PUSCH is exceptionally transmitted when the uplink control information is transmitted, the UE transmits the uplink control information using the PUSCH.

The PUCCH for one UE uses one resource block occupying different frequencies in two slots within the subframe. Two slots use different resource blocks (or subcarriers) within the subframe. That is, two resource blocks allocated to the PUCCH are frequency-hopped in a slot boundary. FIG. 7 shows the case where a PUCCH having m=0, a PUCCH having m=1, a PUCCH having m=2, and a PUCCH having m=3 (that is, PUCCHs for four UEs) are allocated to the subframe.

The PUCCH may support multiple formats. That is, the PUCCH may transmit uplink control information having a different number of bits per subframe according to a modulation scheme. For example, in case of using a Binary Phase Shift Keying (BPSK) scheme, uplink control information of 1 bit may be transmitted through the PUCCH and, in case of using a Quadrature Phase Shift Keying (QPSK) scheme, uplink control information of 2 bits may be transmitted through the PUCCH.

Next, a Random Access (RA) procedure provided by the LTE system will be described. The RA procedure provided by the LTE system is divided into a contention based RA access procedure and a non-contention based RA procedure. The contention based RA procedure and the non-contention based RA procedure are determined depending on whether the UE or the eNB directly selects a random access preamble used in the RA procedure.

In the non-contention based RA procedure, the UE uses a random access preamble directly allocated by the eNB. Accordingly, if the eNB allocates a specific random access preamble only to the UE, only the UE uses the random access preamble and the other UEs do not use the random access preamble. Accordingly, a one-to-one relationship between the random access preamble and the UE which uses the random access preamble is satisfied and collision does not occur. In this case, since the eNB may become aware of the UE as soon as the random access preamble is received, efficiency increases.

In contrast, in the contention based RA procedure, since the UE arbitrarily selects one available random access preamble and transmits the selected random access preamble, there is a possibility that a plurality of UEs uses the same random access preamble. Accordingly, even when the eNB receives a specific random access preamble, the eNB is not aware of the UE which transmits the random access preamble.

First, a UE performs the RA procedure when the UE performs initial access because there is no RRC Connection with an eNB, when the UE initially accesses a target cell during a handover procedure, when the RA procedure is requested by a command of an eNB, when there is uplink data transmission in a situation where uplink time synchronization is not aligned or where a specific radio resource used for requesting radio resources is not allocated, and when a recovery procedure is performed in case of radio link failure or handover failure.

Figure 8:
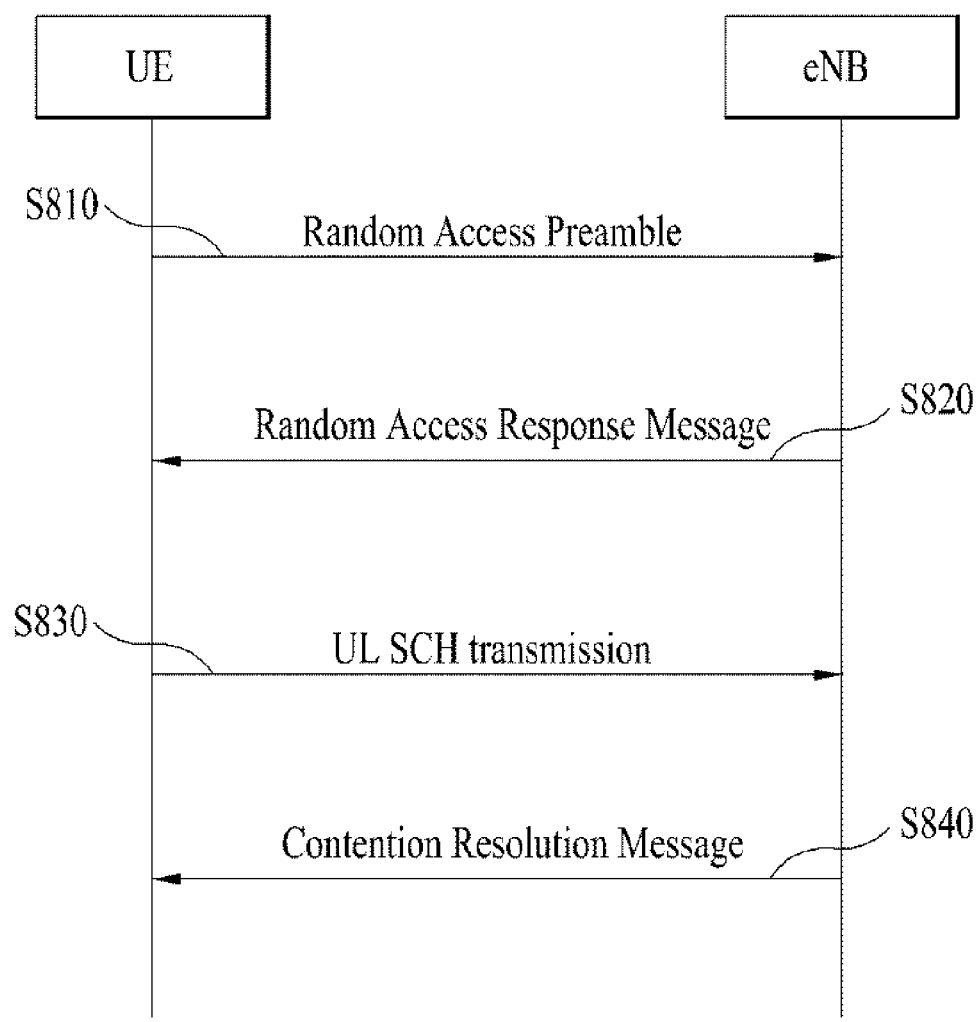
FIG. 8 is a diagram showing a process of operating a UE and an eNB in a contention based random access procedure provided by an LTE system.

FIG. 8 is a diagram showing a process of operating a UE and an eNB in a contention based RA procedure provided by an LTE system.

Referring to FIG. 8, the UE receives and stores information about RA from the eNB through system information. If the RA procedure is necessary, the UE transmits a random access preamble (also referred to as Message 1) to the eNB (S810). When the eNB receives the random access preamble from the UE, the eNB transmits a random access response (also referred to as Message 2) to the UE (S820). More specifically, downlink scheduling information of the random access response message may be CRC-masked with an RA-RNTI so as to be transmitted on an L1/L2 control channel (PDCCH). The UE which receives the downlink scheduling signal masked with the RA-RNTI may receive and decode the random access response message through a PDSCH.

Thereafter, the UE determines whether the random access response information allocated to the UE is present in the random access response message. The determination as to whether the random access response information allocated to the UE is present may be made depending on whether a Random Access Preamble ID (RAID) for the preamble transmitted by the UE is present. The random access response information includes timing advance (TA) indicating timing offset information for synchronization, radio resource allocation information used for uplink (uplink grant information), a temporary identifier (e.g., T-CRNTI) for identifying the UE, etc.

When the UE receives the random access response information, the UE transmits an uplink message (also referred to as Message 3) via an uplink shared channel (SCH) according to the radio resource allocation information (uplink grant) included in the response information (S830). The eNB transmits a contention resolution message (also referred to as Message 4) to the UE (S840) after receiving the uplink message from the UE.

Hereinafter, a reference signal (RS) will be described. In general, for channel measurement, an RS, of which both a transmission side and a reception side are already aware, is transmitted from the transmission side to the reception side, along with data. The RS indicates channel measurement and a modulation scheme so as to enable a demodulation process. The RS is divided into a dedicated RS (DRS) for an eNB and a specific UE, that is, a UE-specific RS, and a common RS (CRS) which is a cell-specific RS for all UEs within a cell.

The cell-specific RS includes an RS which is used to enable the UE to measure and report a CQI/PMI/RI to the eNB and is also referred to as a Channel State Information (CSI)-RS.

Figure 9:
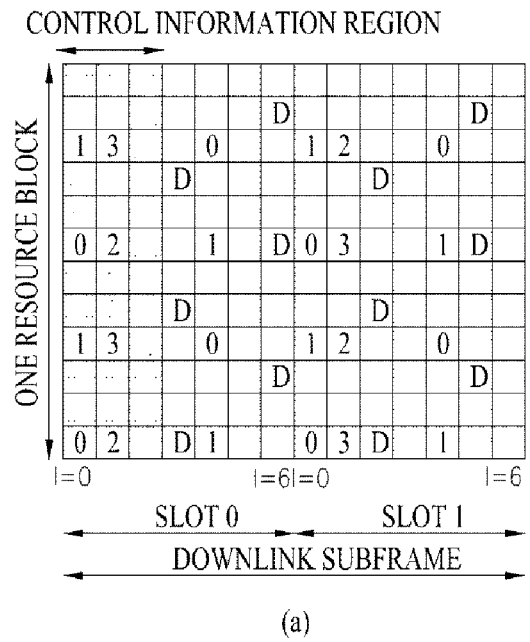
FIG. 9 is a diagram showing the structure of a reference signal in an LTE system supporting downlink transmission using four antennas.
Figure 9:
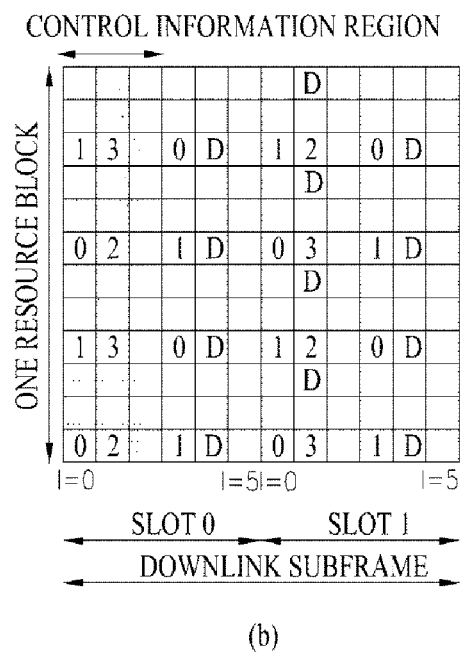

FIG. 9 is a diagram showing the structure of an RS in an LTE system supporting downlink transmission using four antennas. In particular, FIG. 9(a) shows a normal Cyclic Prefix (CP) and FIG. 9(b) shows an extended CP.

Referring to FIG. 9, 0 to 3 described in blocks indicate CRSs which are cell-specific RSs transmitted via antenna ports 0 to 3 for channel measurement and data de-modulation and the CRS which is the cell-specific RS may be transmitted to the UE over a data information region or a control information region.

"D" described in a block indicates a downlink Demodulation (DM)-RS which is a UE-specific RS and supports single-antenna port transmission through a data region, that is, through a PDCCH. The UE receives information indicating whether or not the UE-specific RS is present through a higher layer.

Hereinafter, a Multicast Broadcast Single Frequency Network (MBSFN) subframe will be described.

An MBSFN subframe refers to a subframe having a CP length greater than that of a normal subframe to suit a long delay time due to large coverage characteristics, for Multimedia Broadcast/Multicast service (MBMS) transmission. A system information messages broadcast by eNBs located in an MBMS area for MBSFN transmission is configured to inform UEs whether a subframe which will be transmitted in the future is scheduled to a normal subframe or an MBSFN subframe.

Accordingly, in a period which is determined to a period, in which an MBSFN subframe is transmitted, by the eNBs located in the MBMS area, data other than data for MBMS broadcast for UEs cannot be transmitted and thus downlink resource efficiency may be deteriorated. That is, a waste MBSFN subframe in which MBMS data is not transmitted may occur.

In the standardization of the LTE-Advanced system, for efficient and flexible use of downlink resources, it is decided that a PDSCH may be mapped to an MBSFN subframe used for MBMS transmission. Thus, it is possible to transmit data to the UE using an MBSFN subframe in which MBMS data is not included. An MBSFN subframe to which a PDSCH is mapped is also referred to as a fake-MBSFN subframe.

As described above, an RA procedure and, more particularly, a non-contention based RA procedure is very important in performing various functions such as handover, uplink data transmission instruction, etc. and is performed in order to realize fast and reliable signal transmission and reception for RA between a UE and an eNB. Accordingly, the RA response message including the uplink grant information of the UE as the response to a PRACH signal of the UE, that is, Message 2, is generally transmitted from the eNB to the UE using a transmit diversity scheme.

However, since a CRS is not mapped to a PDSCH which is a data information region in the above-described MBSFN subframe and the transmit diversity scheme is performed based on a CRS in the current LTE standard, the RA response message is not transmitted in the MBSFN subframe, which will be described in greater detail.

As described above, a PDCCH CRC-masked with an RA-RNTI transmits a downlink scheduling signal, that is, downlink grant. A UE which receives the downlink grant may decode an RA response signal from the PDSCH based on the downlink grant and acquire uplink grant information. Table 1 shows the transmission scheme of the PDSCH if the PDSCH is CRC-masked with the RA-RNTI.

TABLE 1

| DCI format | Search Space | Transmission scheme of PDSCH corresponding to PDCCH |
| --- | --- | --- |
| DCI format 1C | Common | If the number of PBCH antenna ports is one. Single-antenna port, port 0 is, otherwise Transmit diversity |
| DCI format 1A | Common | If the number of PBCH antenna ports is one. Single-antenna port, port 0 is used. otherwise Transmit diversity |

Referring to Table 1, a DCI format 1C or 1A may be acquired from the PDCCH CRC-masked with the RA-RNTI. In the DCI formats 1C and 1A, if the number of PBCH antenna ports is 1, the PDSCH is transmitted using a single antenna port, that is, an antenna port 0 and, if the number of PBCH antenna ports is not 1, the PDSCH is transmitted using a transmit diversity scheme. That is, the RA response is transmitted using a single-antenna transmission scheme or a transmit diversity scheme. Both the single-antenna transmission scheme and the transmit diversity scheme are based on a CRS which is a cell-specific RS.

Figure 10:
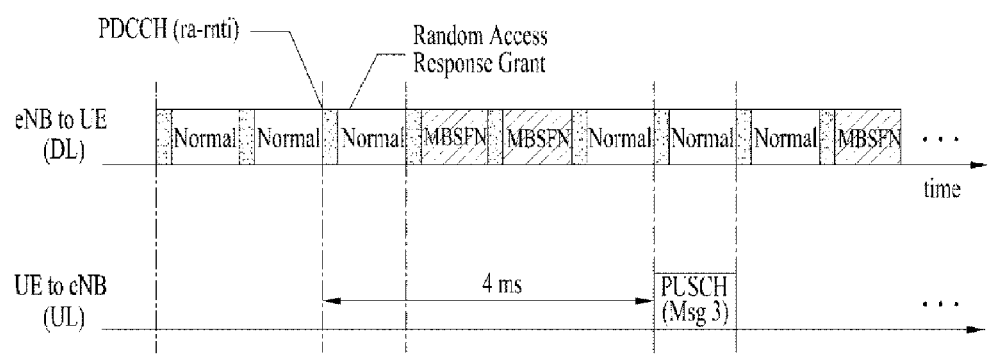
FIGS. 10 and 11 are diagrams illustrating a method of transmitting a random access response according to embodiments of the present invention.
Figure 11:
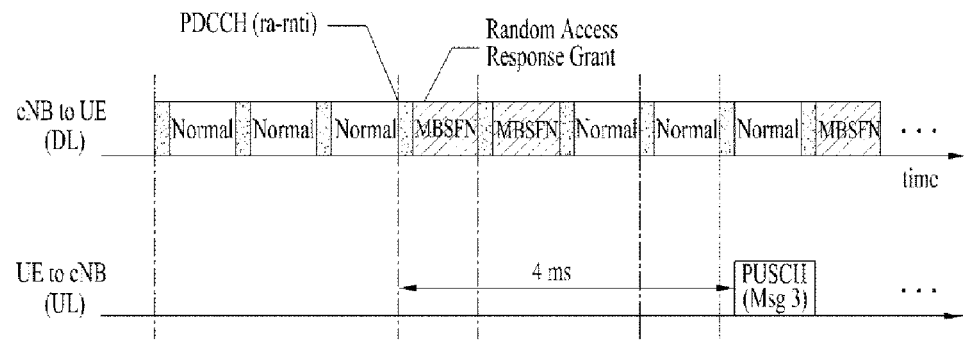

FIGS. 10 and 11 are diagrams illustrating a method of transmitting an RA response according to embodiments of the present invention.

In the case where a PDCCH CRC-masked with an RA-RNTI is transmitted in a control information region of a normal subframe as shown in FIG. 10, since a CRS is present in the data information region, the eNB may transmit an RA response using a single-antenna transmission scheme or a transmit diversity scheme based on the CRS which is the cell-specific RS.

However, in the case where a PDCCH CRC-masked with an RA-RNTI is transmitted in a control information region of an MBSFN subframe as shown in FIG. 11, since a CRS is not present in the data information region of the MBSFN subframe, the eNB may not use a single-antenna transmission scheme or a transmit diversity scheme. As a result, since the eNB transmits an RA response message after waiting for a scheduled normal subframe, latency occurs. If a window for transmitting the RA response message has elapsed, the RA message may not be transmitted.

Accordingly, in the present invention, if the UE is set to a transmission mode 9, the eNB transmits the RA response using a single antenna port, that is, antenna port 7. Here, the antenna port 7 indicates an antenna port for transmitting a DM-RS which is a UE-specific RS.

The transmission mode 9 is defined for a PDSCH transmitted using a multilayer transmission scheme based on a DM-RS transmitted through antenna ports 7 to 14 and is defined as shown in Table 2. In particular, a PDCCH to which Table 2 is applied is CRC-masked with a C-RNTI.

TABLE 2

| Transmission mode | DCI format | Search Space | Transmission scheme of PDSCH corresponding to PDCCH |
| --- | --- | --- | --- |
| Mode 9 | DCI format 1A | Common and UE specific by C-RNTI | Non-MBSFN subframe: If the number of PBCH antenna ports is one. Single-antenna port, port 0 is use otherwise Transmit diversity MBSFN subframe: Single-antenna port, port 7 |
| | DCI format 2C | UE specific by C-RNTI | Up to 8 layer transmission, ports 7-14 |

More specifically, in the transmission mode 9, it is possible to acquire a DCI format 1A or 2C from a PDCCH CRC-masked with the C-RNTI. In particular, in the DCI format 1A, if the subframe is an MBSFN subframe, normal data is transmitted using a single antenna port, that is, antenna port 7.

Table 3 in which the transmission of the RA response signal in the MBSFN subframe is defined is obtained from Table 1. Similarly to Table 1, the PDCCH is CRC-masked with the RA-RNTI.

TABLE 3

| DCI format | Search Space | Transmission scheme of PDSCH corresponding to PDCCH |
|---|---|---|
| DCI format 1C | Common | If the number of PBCH antenna ports is one. Single-antenna port, port 0 is used. otherwise Transmit diversity |
| DCI format 1A | Common | If the number of PBCH antenna ports is one. Single-antenna port, port 0 is, otherwise Transmit diversity If UE is configured with transmission mode 9, and in MBSFN subframes Single-antenna port, port 7 is used. |

Referring to Table 3, it is possible to acquire a DCI format 1C or 1A from the PDCCH CRC-masked with the RA-RNTI. Unlike Table 1, in the downlink grant indicated by the DCI format 1A, the PDSCH for transmitting the RA response is transmitted even in the MBSFN subframe.

More specifically, if the UE is set to the transmission mode 9 and the subframe is an MBSFN subframe, the PDSCH is transmitted using a single antenna port, that is, an antenna port 7.

Although the UE is set to transmission mode 9 in Table 3 and the transmission mode 9 is supported if a PDCCH CRC-masked with an RA-RNTI is received, the PDSCH may be transmitted to a UE, which is not set to transmission mode 9, using a single antenna port, that is, antenna port 7.

Accordingly, the UE may decode the PDSCH using a DM-RS transmitted using antenna port 7 and, as a result, the eNB may transmit an RA response even in an MBSFN subframe.

Accordingly, according to the method of transmitting the RA response of the present invention, since the RA response may be transmitted even in an MBSFN subframe according to a specific condition, it is possible to reduce latency and reduce an unnecessary wait time for transmission of the RA response. Thus, it is possible to efficiently use time resources.

Figure 12:
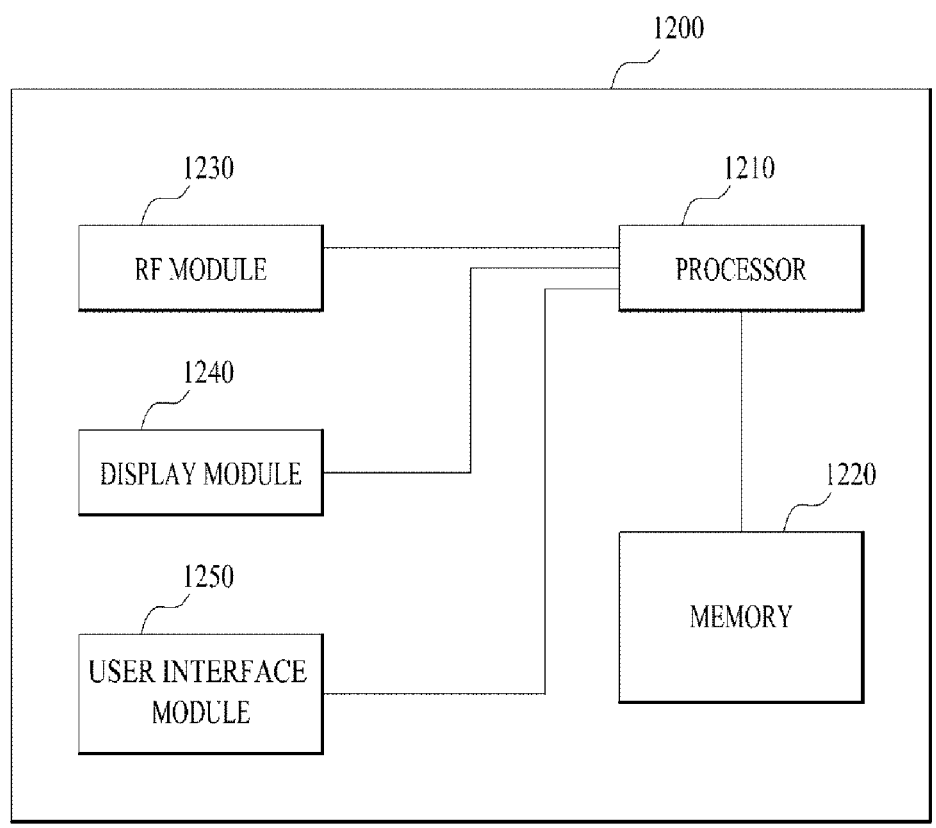
FIG. 12 is a block diagram showing the configuration of a communication device according to an embodiment of the present invention.

FIG. 12 is a block diagram showing the configuration of a communication device according to an embodiment of the present invention.

Referring to FIG. 12, the communication device 1200 includes a processor 1210, a memory 1220, an RF module 1230, a display module 1240 and a user interface module 1250.

Some modules of the communication device 1200 may be omitted, for convenience of description. In addition, the communication device 1200 may further include necessary modules. Some modules of the communication device 1200 may be subdivided. The processor 1210 is configured to perform the operation according to the embodiment of the present invention described with reference to the drawings. More specifically, for the detailed operation of the processor 1210, refer to the description of FIGS. 1 to 11.

The memory 1220 is connected to the processor 1210 and stores an operating system, an application, program code, data, etc. The RF module 1230 is connected to the processor 1210 and serves to convert a baseband signal to a radio signal or convert a radio signal to a baseband signal. For conversion, the RF module 1230 performs analog conversion, amplification, filtering and frequency up-conversion or an inverse process thereof. The display module 1240 is connected to the processor 1210 to display a variety of information. The display module 1240 includes, but is not limited to, well-known devices such as a Liquid Crystal Display (LCD), a Light Emitting Diode (LED), and an Organic Light Emitting Diode (LED). The user interface module 1250 is connected to the processor 1210 and includes a combination of well-known user interfaces such as a keypad and a touch screen.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the relay node and the base station. A specific operation which has been described as being performed by the base station may be performed by an upper node of the base station. In other words, it will be apparent that various operations performed for communication with the user equipment in the network which includes a plurality of network nodes along with the base station can be performed by the base station or network nodes other than the base station. The term base station may be replaced with terms such as fixed station, Node B, eNode B (eNB), and access point.

The embodiments according to the present invention can be implemented by various means, for example, hardware, firmware, software, or a combination thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations described above. Software code may be stored in a memory unit and then may be driven by a processor. The memory unit may be located inside or outside the processor to transmit and receive data to and from the processor through various well known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the method of transmitting the random access response signal in a wireless communication system and the apparatus thereof are described as being applied to a 3GPP LTE system, they are applicable to various wireless communication systems in addition to the 3GPP LTE system.

The invention claimed is:

1. A method of performing a random access procedure at a user equipment (UE) in a wireless communication system, the method comprising:
    transmitting a random access preamble to a base station;
    receiving a random access response included in a data region of a specific subframe from the base station; and
    transmitting an uplink message to the base station based on an uplink grant included in the random access response,
    wherein the UE is configured to receive the data region based on a UE-specific reference signal defined by multiple antenna ports,
    wherein, when the specific subframe is a Multicast Broadcast Single Frequency Network (MBSFN) subframe, the data region including the random access response is demodulated based on the UE-specific reference signal on the assumption that the data region is transmitted via a predetermined antenna port among the multiple antenna ports by the base station, wherein a cell-specific reference signal is not present in the data region of the MBSFN subframe, and
    wherein, when the specific subframe is not the MBSFN subframe, the data region including the random access response is demodulated based on the cell-specific reference signal.

2. The method according to claim 1, wherein the receiving the random access response includes:
    detecting downlink grant masked with a Random Access (RA)-Radio Network Temporary Identity (RNTI) in the control region of the MBSFN subframe; and
    acquiring the random access response from the data region of the MBSFN subframe based on the downlink grant.

3. The method according to claim 1, wherein the predetermined antenna port is a logical antenna port 7.

4. A user equipment (UE) in a wireless communication system, comprising:
    a wireless communication module configured to transmit and receive a signal to and from a base station; and
    a processor configured to control the wireless communication module and process the signal,
    wherein the processor controls transmission of a random access preamble to the base station, reception of a random access response included in a data region of a specific subframe from the base station and transmission of an uplink message to the base station based on an uplink grant included in the random access response,
    wherein the UE is configured to receive the data region based on a UE-specific reference signal defined by multiple antenna ports,
    wherein when the specific subframe is a Multicast Broadcast Single Frequency Network (MBSFN) subframe, the data region including the random access response is demodulated based on the UE-specific reference signal on the assumption that the data region is transmitted via a predetermined antenna port among the multiple antenna ports by the base station, wherein a cell-specific reference signal is not present in the data region of the MBSFN subframe, and
    wherein, when the specific subframe is not the MBSFN subframe, the data region including the random access response is demodulated based on the cell-specific reference signal.

5. The user equipment according to claim 4, wherein the processor detects downlink grant masked with a Random Access (RA)-Radio Network Temporary Identity (RNTI) in the control region of the MBSFN subframe, and acquires the random access response from the data region of the MBSFN subframe based on the downlink grant.

6. The user equipment according to claim 4, wherein the predetermined antenna port is a logical antenna port 7.

* * * * *